United States Patent [19]
Likas et al.

[11] 3,782,567
[45] Jan. 1, 1974

[54] COMBINED BOOM, GRAPPLE AND BUNK ASSEMBLY

[76] Inventors: Algerd C. Likas, 835-56th Ave., Lachine; Douglas D. Hamilton, 139 Lazard Ave., Mount Royal, Quebec, both of Canada

[22] Filed: May 21, 1971

[21] Appl. No.: 145,864

Related U.S. Application Data

[63] Continuation-in-part of Ser. No. 814,913, April 10, 1969, abandoned.

[52] U.S. Cl.................. 214/77, 214/147 G, 294/88, 294/106, 214/152
[51] Int. Cl................................. B60p 1/48
[58] Field of Search................... 214/77, 92, 147 R, 214/147 G, 523, 653, 501; 294/88, 106, 113

[56] References Cited
UNITED STATES PATENTS

| | | | |
|---|---|---|---|
| 3,033,397 | 5/1962 | Busch | 214/501 |
| 3,477,596 | 11/1962 | Michaelson | 214/92 |

FOREIGN PATENTS OR APPLICATIONS

| | | | |
|---|---|---|---|
| 659,445 | 5/1963 | Canada | 214/77 |

*Primary Examiner*—Gerald M. Forlenza
*Assistant Examiner*—George F. Abraham
*Attorney*—Stevens, Davis, Miller & Mosher

[57] ABSTRACT

A tree-handling apparatus including components therefor adapting a vehicle for skidding trees by grasping a group of such trees on the ground and lifting the grasped end to facilitate dragging the trees endwise. The vehicle is a mobile self-propelled articulated type having a boom, grapple and bunk assembly pivotally mounted thereon adjacent the trailing end thereof for movement about a substantially vertical axis. The boom, grapple and bunk assembly includes a C-shaped boom pivotally mounted on a base for movement about a horizontal axis, such base in turn being pivotally attached to the vehicle for movement about a vertical axis. The boom includes a primary boom member and a secondary boom member pivotally interconnected with power means for moving one relative to the other and for pivoting the main boom member about its pivotal mounting. A pair of bunks are attached to the boom, one of which engages the underside of a group of trees grasped by a grapple suspended from the secondary boom and which provides a counteracting couple tending to prevent pivoting of the primary boom member during skidding of the trees resulting from forces applied to the tree to drag the same, the trees being tightly grasped by the grapple. The other bunk engages the grapple adjacent the tip thereof to provide reactionary forces on the grapple counteracting forces applied to the grapple by the trees during dragging thereof, the dragging forces being transmitted to the vehicle through the attachment of the grapple to the boom and engagement of the grapple with the abutment on the vehicle. The grapple is constructed such that the bite of the jaw may be selectively varied in a grapple jaw-closed position thereby facilitating tightly grasping a wide variation in the size of the bundle of trees.

26 Claims, 18 Drawing Figures

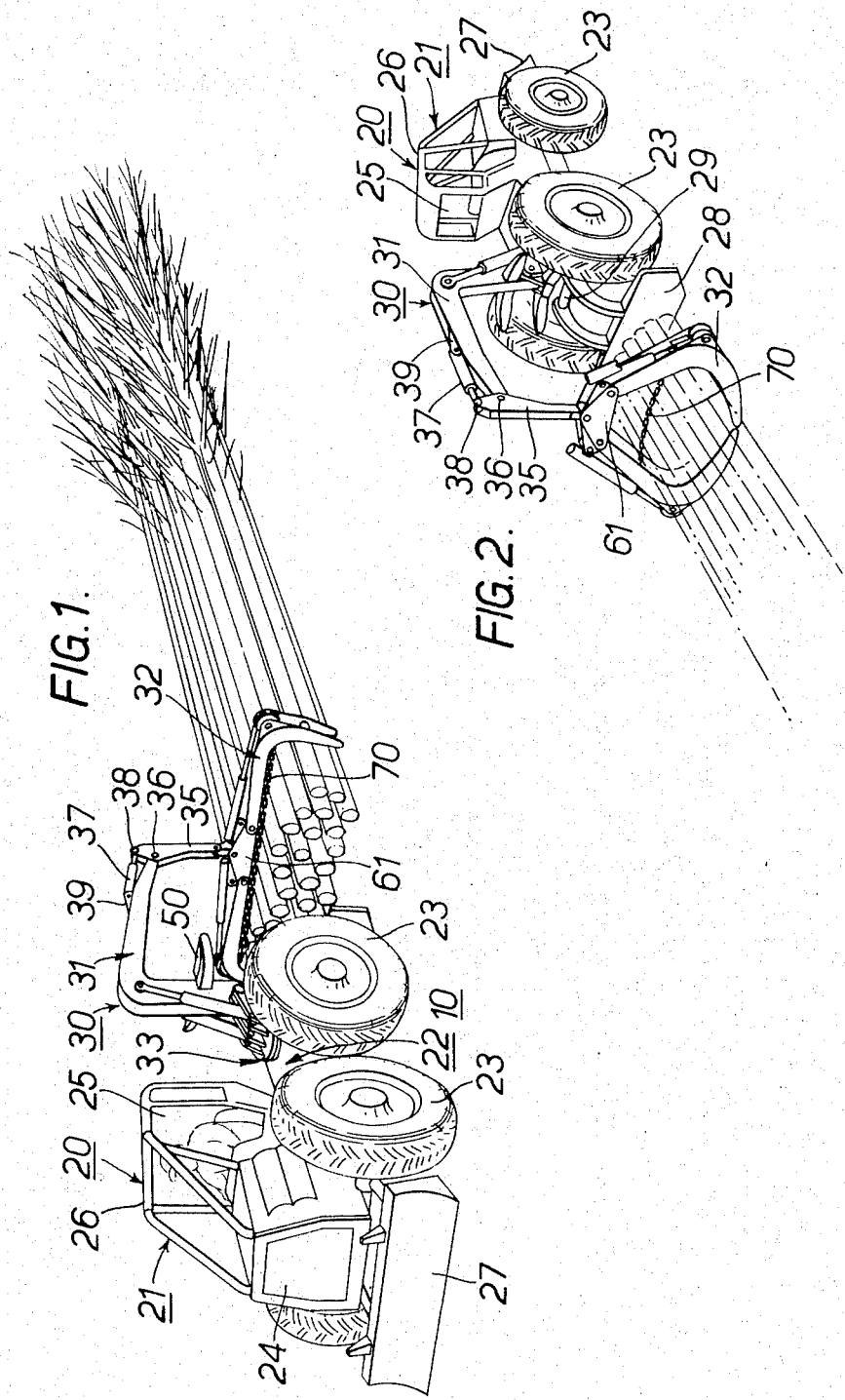

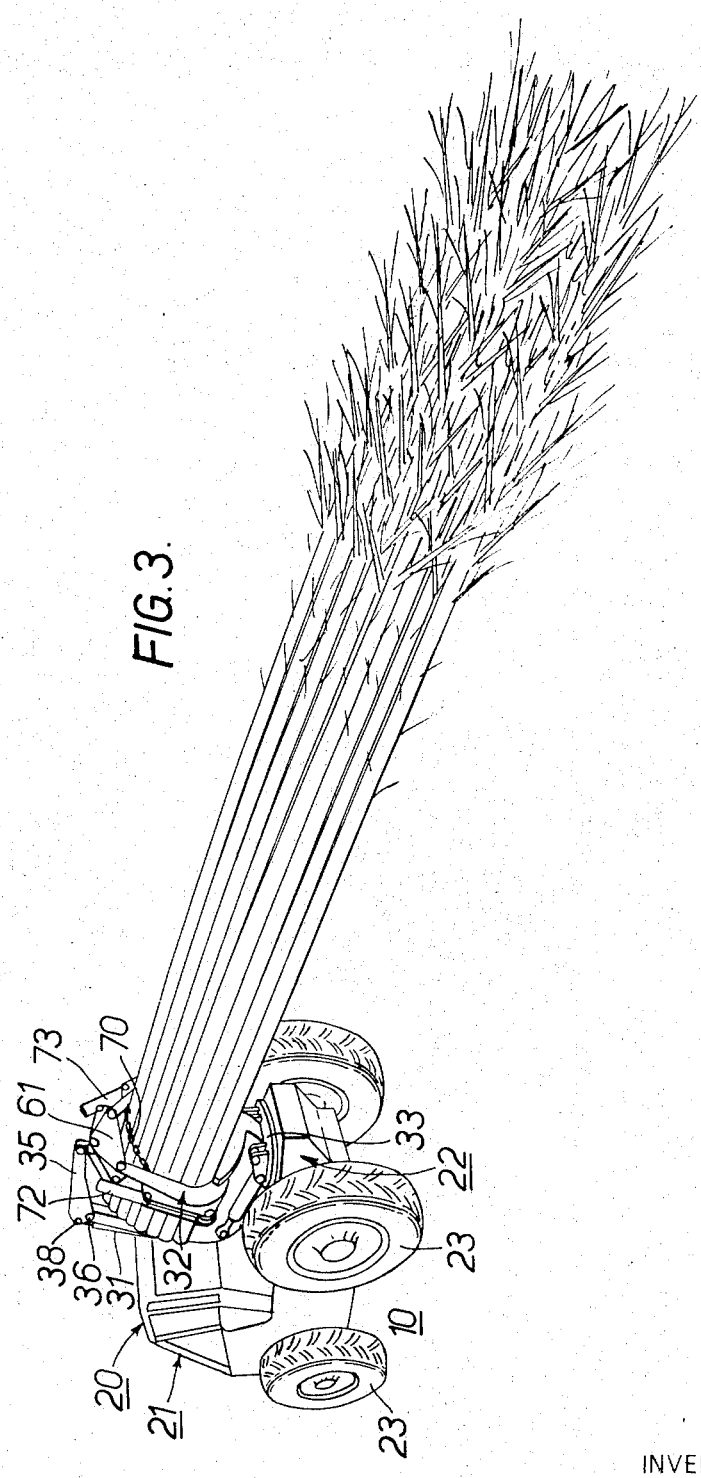

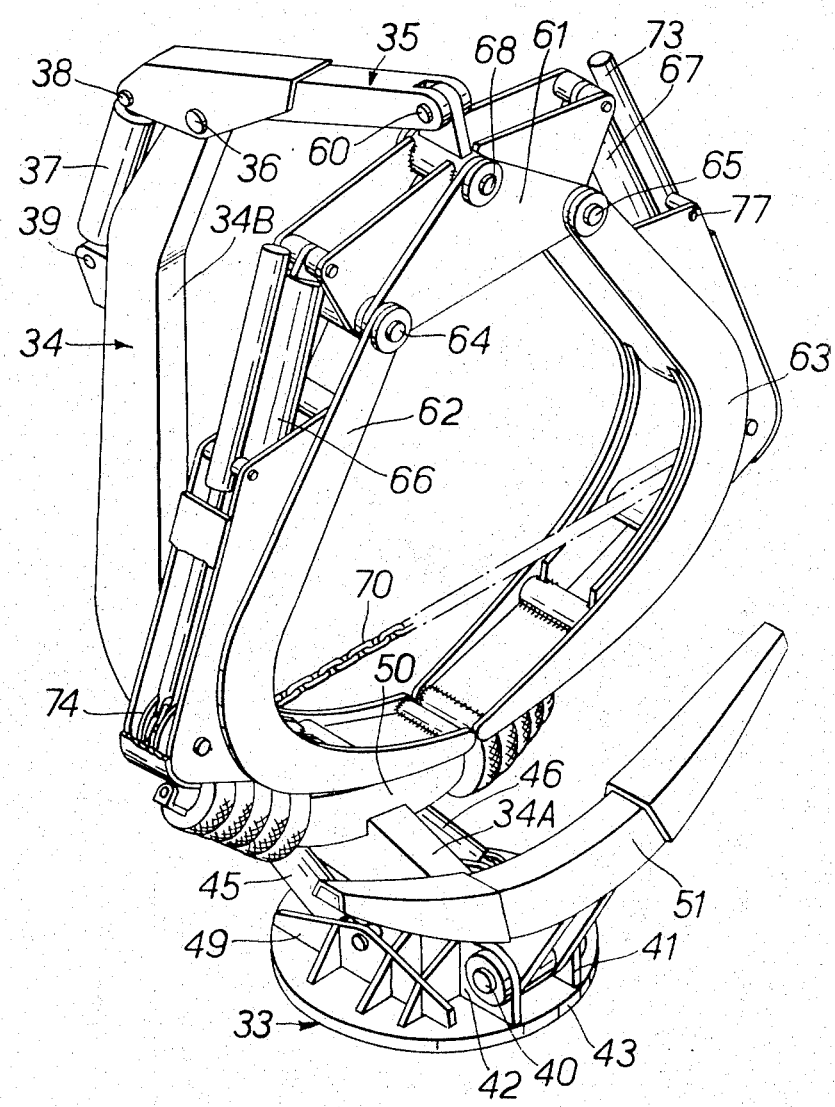

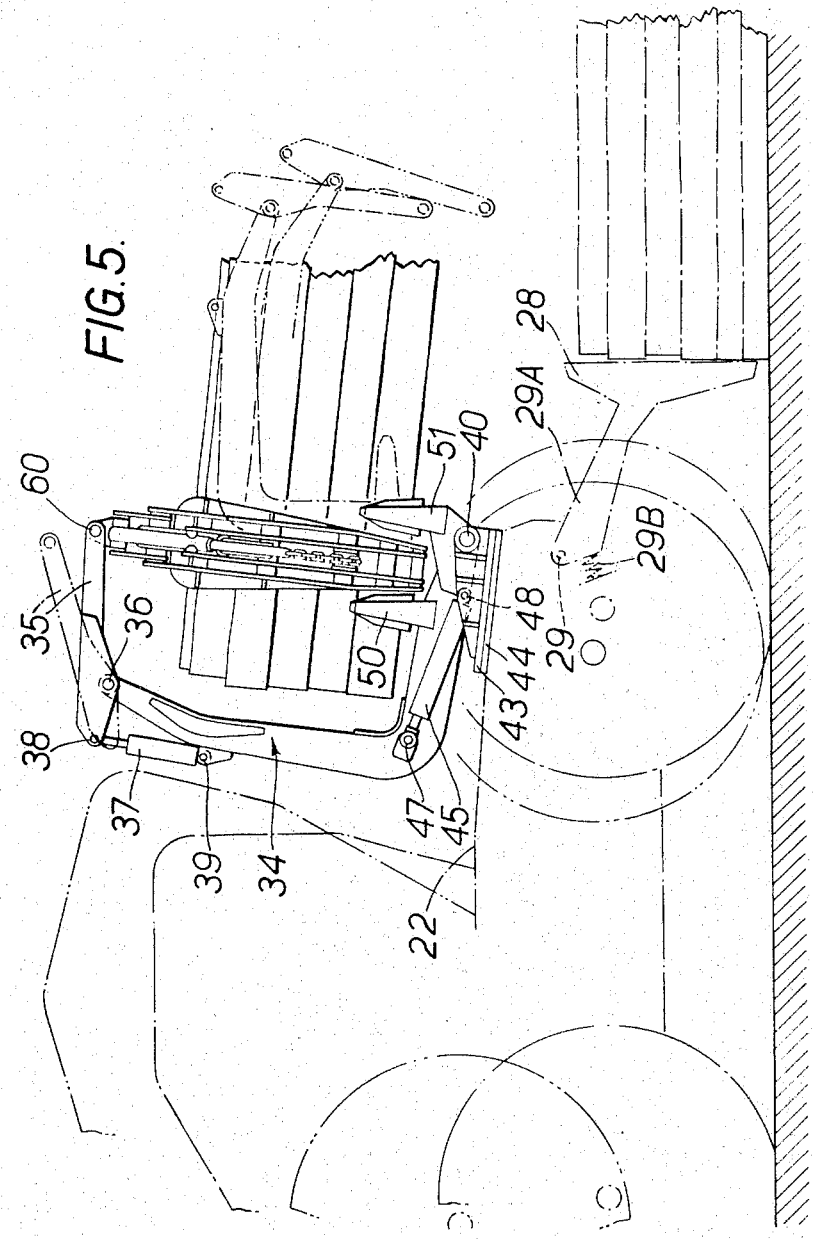

PATENTED JAN 1 1974

INVENTOR's
Algerd C. Likas & Douglas D. Hamilton
BY
Stevens, Davis, Miller & Mosher
ATTORNEY's

COMBINED BOOM, GRAPPLE AND BUNK ASSEMBLY

This is a continuation-in-Part of application Ser. No. 814,913 filed Apr. 10, 1969 now abandoned.

This invention relates to improvements in a bunk for a tree skidding vehicle and more particularly to a combined boom, grapple and bunk assembly. The invention further relates to an improved self-loading skidder vehicle having a combined boom, grapple and bunk assembly mounted thereon.

In modern logging operations, trees are often felled and a number of trees brought to a common location whereafter they are collected and skidded to a further selected site. Proposals have been made for self-loading vehicles adapted to pick up the collected trees and skid them to such further site as exemplified by U.S. Pat. No. 3,342,357 issued Sept. 19, 1967. In this patented structure, however, the entire longitudinal forces caused by skidding, i.e., dragging the trees are transferred to the vehicle through the boom assembly from which the grapple is suspended. This causes substantial tipping forces on the boom sections tending to pivot it rearwardly to a loading position.

Accordingly, it is a principal object of the present invention to provide an improved assembly for use in picking up and skidding the trees. Vehicles for handling logs which include the self-loading feature are known as exemplified by U.S. Pat. Nos. 3,033,397 and 3,079,020 issued, respectively, May 8, 1962 and Feb. 26, 1963. Although these vehicles are self-loading and for use in picking up groups of logs, there is no suggestion such vehicles may be suitable for skidding single trees or groups of trees. One feature required in the self-loading skidder is that the gripple and/or bunk must be adapted to securely anchor the load to the vehicle for skidding and also be adapted to anchor various sizes of loads. In regard to the latter, the grapple or bunk must be adapted to embrace loads which vary considerably in the distance around the load. A bunk having a variable sized bite for engaging a group of trees is illustrated in U.S. Pat. No. 3,204,983 issued Sept. 7, 1965.

Although the foregoing patented devices serve the purposes for which they are intended, they do not provide a unitary self-propelled vehicle which is entirely satisfactory for use under normal field operations. Furthermore, such patented structures do not provide an assembly which may be readily mounted on a vehicle to convert the latter to a selfloading skidder nor an entire unitary assembly consisting of a boom and grapple for loading and unloading, and a bunk which assembly is pivotally mounted on the vehicle for movement about a vertical axis.

Accordingly, a principal object of the present invention is to provide an improved assembly which may be attached to a vehicle, such assembly including a boom, grapple and bunk assembly for loading trees onto the vehicle and thereafter anchoring the trees to the vehicle so that such trees or logs may be skidded to a selected site.

A further principal object of the present invention is to provide a self-propelled mobile skidder vehicle which is self-loading and wherein the mechanism for loading the trees onto the vehicle is further utilized to skid the trees loaded thereon to a selected site. Although the aforementioned U.S. Pat. No. 3,033,397 discloses a self-loading vehicle, it will readily be realized that such vehicle carries the entire load on the chassis and that the forces in so doing are substantially different than forces applied to the bunk mechanism in dragging a portion of the load behind the vehicle as is done in the type of machine illustrated in the aforementioned U.S. Pat. No. 3,342,357.

In accordance with one aspect of the present invention, there is provided a combined boom, grapple and bunk assembly for use on a vehicle to self-load one end of one or more trees onto such vehicle for skidding the trees to a selected location comprising a main boom member, a secondary boom member pivotally secured to said main boom member, means for pivoting said boom members relative to one another about their pivotal interconnection, means for mounting said main boom member on a vehicle for pivotal movement about each of a substantially vertical and horizontal axis, means for pivoting said main boom member about said horizontal axis, a grapple suspended from said secondary boom member, said grapple having a jaw with an open and closed position respectively to receive and embrace the trunk of one or more of said trees, and a laterally extending bunk on said boom engageable with said grapple at a position remote from the connection thereof to said secondary boom member and providing a reactionary force for forces on said grapple having a horizontal component generally parallel to the length of the trees during skidding and also providing a support for a load of trees grasped by the grapple.

In accordance with a still further aspect of the present invention, there is provided an improved grapple for use in an assembly of the foregoing type, i.e., a combined boom, grapple and bunk. Such improved grapple concerns the manner in which the bite size may be varied. Prior attempts to provide grapple jaws having a variable sized bite for holding articles captive, such as a plurality of trees, have included the use of flexible members such as chains as exemplified by U.S. Pats. 3,074,447 issued Jan. 22, 1963 and 3,204,983 issued Sept. 7, 1965. A further patent of interest is U.S. Pat. No. 3,008,731 issued to J. A. Bombardier on Nov. 14, 1961.

When grapples are used to pick up a single article such as one tree, it is unimportant as to whether or not the jaws are completely closed and thus various sized trees may be picked up and firmly grasped by virtue of varying the degree of opening of the jaw. In tree skidders of the type to which the present invention relates, the grapple is utilized to assemble a plurality of logs or trees piled on the ground in stacked relation and tightly grasp such collected groups of trees. Because of having a plurality of trees, it is necessary for the jaw to be closed to hold all articles captive and because of dragging the trees behind the vehicle, it is necessary to apply considerable force anchoring the trees to the grapple.

Accordingly, it is a further primary object of the invention to provide a grapple which is adapted to assemble a plurality of trees, completely embrace such assembled trees and tightly clamp the same even though there are variations in the size of the assembled load.

In accordance with a further aspect of the present invention, there is provided a grapple comprising a frame adapted to be suspended from a boom member, a first rigid jaw member and a second rigid jaw member each secured to said frame with the connections of said members to said frame being disposed in selected spaced relation, at least one of said jaw members being disposed in selected spaced relation, at least one of said jaw members being arcuate and concave in a direction facing the other jaw member, and at least one of which is movable toward and away from the other to form a jaw respectively which is closed and opened by such movement, and in a closed position, has a selected bite area and a further pair of rigid jaw members pivotally secured to respective ones of said first and second members and means to move said further pair of jaw members selectively to vary said bite area when said jaw is closed.

In accordance with a still further aspect of the present invention, there is provided a grapple comprising, in combination, a frame member adapted to be connected to a boom assembly, a pair of arms each pivotally secured to said frame to form a grapple having a jaw, means for moving said pair of arms relative to one another selectively to open and close said grapple jaw and a flexible member anchored at opposed ends to said frame and arm assembly, at least one of said opposed ends being connected to an extendible and retractable assembly, said flexible member being slidably engageable intermediate the ends thereof with each of said arms and engaging respective ones of the arms at a selected position located between the free end of such arm and the connection thereof to the frame.

In accordance with a still further aspect of the present invention, there is provided a boom assembly comprising, in combination, mounting means adapted to be secured to a vehicle for pivotal movement about a vertical axis and a boom member pivotally secured to said mounting means for movement about a horizontal axis, said boom member being arcuate having a first portion and a second portion angularly related with respect to one another, and abutment means secured to at least one of said mounting means and boom having a load-engaging surface extending in a direction generally parallel to the pivot axis of the relative movement of the boom and the mounting means.

In accordance with a still further aspect of the present invention, there is provided a combined boom, grapple and bunk assembly for use on a vehicle to self-load one end of one or more trees onto such vehicle for skidding the trees to a selected location comprising a main boom member, a secondary boom member pivotally secured to said main boom member, means for pivoting said boom members relative to one another about their pivotal interconnection, means for mounting said main boom member on a vehicle for pivotal movement about a substantially horizontal axis, means for pivoting said main boom member about said horizontal axis, a grapple suspended from said secondary boom member, said grapple having a jaw with an open and closed position respectively to receive and embrace the trunk of one or more of said trees, and an abutment engageable with said grapple at a position remote from the connection thereof to said secondary boom member and providing a reactionary force for forces on said grapple having a horizontal component generally parallel to the length of the trees during skidding thereof, said grapple comprising a first and second pair of rigid members, at least one of which is arcuate and at least one of which is movable toward and away from the other to form a jaw respectively which is closed and opened by such movement and, in a closed position, has a selected bite area, and a further self-supporting member movable relative to each of said first and second members selectively to vary said bite area when said jaw is closed.

The invention is illustrated by way of example in the accompanying drawings wherein:

FIG. 1 is an oblique view of a machine constructed in accordance with the present invention, located in a load-pick-up position;

FIG. 2 is a view similar to FIG. 1 but illustrates the bundle of trees collected and grasped by the grapple assembly in preparation for loading the same onto the vehicle;

FIG. 3 is a further view illustrating the bundle of trees anchored and loaded onto a similar vehicle for skidding to a selected site;

FIG. 4 is an oblique view of the boom and grapple bunk assembly for use in mounting on a vehicle to convert such vehicle to a tree skidder of the self-loading type;

FIG. 5 is a side elevational view of the combined boom, grapple and bunk assembly attached to a vehicle, the latter of which is illustrated in phantom;

Figure 6:
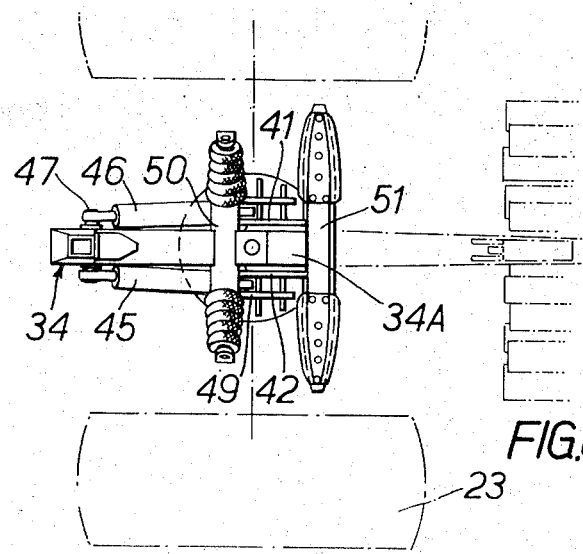
FIG. 6 is a top plan view of a portion of the bunk.

Referring now in detail to the drawings, illustrated in FIGS. 1, 2 and 3 is a self-loading tree skidder vehicle 10 consisting of a self-propelled tractor portion 20 having a combined boom, grapple and bunk assembly 30 mounted thereon. The boom and grapple assembly is mounted in such a manner that it may be moved to one position for picking up one or more trees lying on the ground and thereafter moved to another position to load the butt end of such trees onto the vehicle for skidding the same to a selected location.

The tractor portion 20 may be any type, for example, an articulated type such as the commercially available "Clark Ranger" sold by the Clark Equipment Company. Alternatively, it may be a track vehicle, for example, the type illustrated in U.S. Pat. No. 3,227,295 issued Jan. 4, 1966. The skidder illustrated in the latter patent may be converted to one of the present type by eliminating the boom and grapple assembly and the bunk assembly, and substituting therefor the combined boom, grapple and bunk assembly 30 which will be described in detail hereinafter.

The self-propelled mobile vehicle 20, illustrated in FIGS. 1, 2 and 3, is an articulated type having a front chassis 21 and a rear chassis 22 pivotally interconnected for articulated movement relative to one another about a vertical axis and, if desired, about a horizontal axis. Each of the front and rear chasses are mounted on a pair of rubber-tired wheels 23 driven by a motor 24 located on the front chassis. An operator's cab or station 25 is also located on the front chassis and a protective enclosure is provided for the operator by a cab assembly 26. The front chassis may also have an angle blade 27 secured thereto and located at the front of the vehicle for use in clearing away objects located in the path of the vehicle. The angle blade 27 may be selectively and controllably raised and lowered in any convenient manner, for example, by hydraulic means controlled by the vehicle operator. Similarly, a vertically disposed bumper plate 28 (see FIG. 5) may be secured to the rear chassis 22 and located rearwardly of the wheels 23 for abutting the ends of a group of trees lying on the ground to align the same if necessary. The bumper means 28 may be rigidly attached to the rear chassis 22 or alternatively, pivotally attached thereto as, for example, for movement about a horizontal axis 29. The bumper member 28 may be retained in a selected pivoted lower position by engagement of an arm 29a connecting the plate 28 to the chassis with a bumper or resilient abutment member 29b.

The combined boom, grapple and bunk assembly 30 is pivotally mounted on the rear chassis 22 of the vehicle for movement about a substantially vertical axis. Pivoting of the assembly allows the trees to be drawn behind in trailing relation while the vehicle is permitted to turn left or right with reference to the foreward direction of travel of the vehicle without applying undue twisting forces on the assembly.

The boom, grapple and bunk assembly 30 consists of a boom portion 31, a grapple portion 32, a mounting assembly 33 for attaching the boom 31 to the vehicle, and a pair of laterally extending bunk members 50 and 51 for supporting a load of logs grasped by the grapple and trailed behind the vehicle during skidding thereof. The bunk member 51 provides an abutment for the lower or tip end of the grapple during skidding of trees anchored to the grapple.

The boom 31 consists of a main boom member 34 and a secondary boom member 35 pivotally interconnected as, for example, by a pivot pin 36. The secondary boom member 35 may be pivoted about the pin 36 by a hydraulic cylinder assembly 37 pivotally connected, respectively, at opposed ends by pins 38 and 39 to the boom members 35 and 34. The main boom member 34 is pivotally connected to the mounting member 33 by a pin 40 which passes through the boom section 34 and a pair of flanges 41 and 42 located one on each side of the boom member 34 and secured to a plate 43. The plate 43 forms a portion of the mounting member 33 which effectively is a turntable or fifth wheel assembly having a further plate 44 secured to the vehicle chassis 22 and such plates 43 and 44 are pivotally interconnected for movement about a substantially vertical axis in any convenient manner. The boom member 34 is controllably pivotally movable about the pivot pin 40 by a pair of hydraulic cylinders 45 and 46, each connected at opposed ends respectively to the mounting member 33 and the main boom section 34. Hydraulic cylinder 45, for example, is pivotally connected, at one end, by a pin 47 to the boom member 34 and at the other end by a pin 48 to the flange 42, previously described, and a further flange 49 disposed parallel thereto and in selected spaced relation therewith.

The tree bunk member 50 is secured to a leg portion 34a of the primary boom member 34 and the bunk member 51 is mounted on one or the other of the plate 43 and boom 34a of the mounting assembly 33. As will be noted in FIG. 5, the leg portion 34a of the primary boom member 34 is generally horizontal in a vehicle-loaded and skidding position and extends forwardly, with reference to the direction of travel of the vehicle during skidding, from the pivot pin 40. The bunk 50 is located forwardly of such pivot pin and such relative disposition of the bunk 50 and pivot pin is significant as will become apparent hereinafter. In a vehicle-loaded and skidding position, the primary boom 34 has a further leg portion 34b which is directed in a generally vertical direction and in such position the secondary boom member 35 extends rearwardly therefrom in a general horizontal direction. The bunks 50 and 51 are each preferably mounted on the boom portion 34a and spaced from one another a distance only slightly more than the thickness of the grapple jaw members adjacent the tip ends thereof taken in a direction perpendicular to the direction of movement of the jaw members. This spacing permits bunks 50 and 51 to act as abutments for the tip end of the grapple during respectively rearward and forward movement of the vehicle having a group of trees grasped by the grapple and resting on the bunks.

The grapple assembly 32 is pivotally connected to the secondary boom member 35 by a pivot pin 60 located adjacent the free end thereof. The grapple 32 is suspended from the boom member 35 and is preferably freely suspended although it may also be controllably pivoted about the pin 60 as is the case in the structure illustrated in the aforementioned U.S. Pat. No. 3,033,397. In being freely suspended, the grapple remains in a vertical plane during pivotal movement of the boom.

The grapple 32 includes a frame member 61 and a pair of arcuate arms 62 and 63 pivotally secured thereto respectively by pins 64 and 65. The arcuate arms 62 and 63 are controllably pivoted about their respective pivot pins 64 and 65 by hydraulic cylinder assemblies 66 and 67. The hydraulic cylinders 66 and 67 are each pivotally connected at one end to the frame 61 and at the other end to respective ones of the arcuate arms 62 and 63. The frame member 61 may be rigidly connected to a member pivotally attached by the pin 60 to boom member 35, or alternatively, a further pivotal connection may be provided as, for example, by pivot pin 68. The pivot axis of pin 68 is located substantially perpendicular to the pivot axis of pin 60. The members 62 and 63 effectively provide a jaw for grasping a single or plurality of trees. The free end of the members 62 and 63 are movable toward and away from one another and, in a closed position, define a jaw having a selected bite area. This bite area determines the quantity of trees which may be anchored securely to the grapple for skidding purposes. In the embodiment illustrated in FIGS. 1 – 12, the bite area may be selectively varied by a chain member 70 extending from one lever 62 to the other lever 63 and incorporating means for varying the effective length of the chain.

Figure 7:
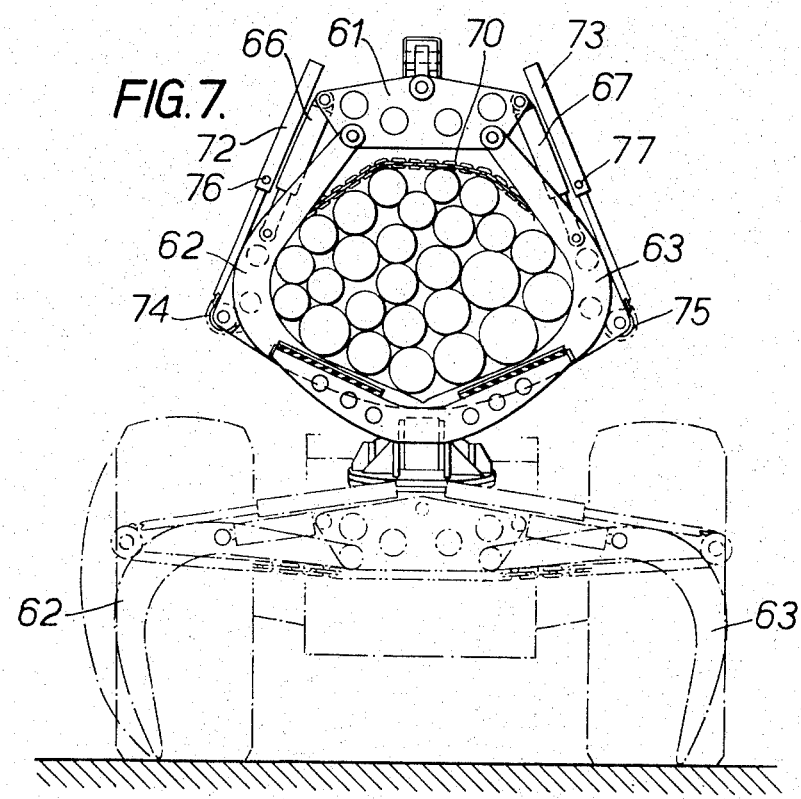
FIG. 7 is a rear elevational view of the vehicle illustrated in FIG. 5.
Figure 9:
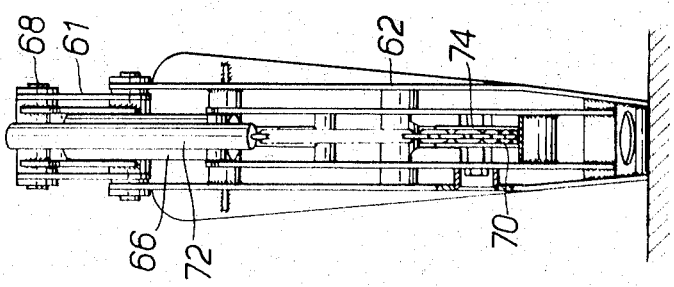
FIG. 9 is a right-hand side elevational view of the grapple illustrated in FIG. 8.
Figure 8:
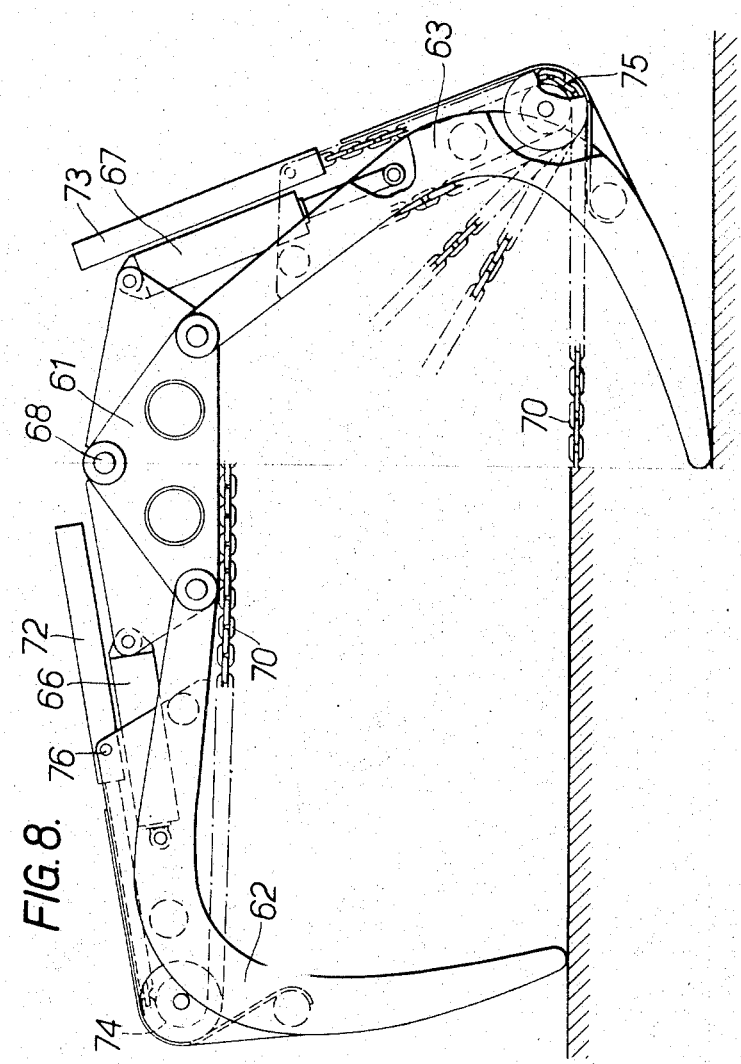
FIG. 8 is an elevational view of the grapple portion having the left-hand portion illustrated in a load-pick-up position and the right-hand portion in a load-anchoring or jaw-closed positon.

Referring to FIG. 7, the chain 70 is anchored at opposed ends to respective extendible and retractable hydraulic cylinder assemblies 72 and 73. The chain 70 passes over a pulley 74 journalled on the grapple arm 62 and a pulley 75 journalled on the grapple arm 63. The hydraulic cylinder assemblies 72 and 73 are pivotally secured by pins 76 and 77 respectively to the grapple arms 62 and 63. The pulleys 74 and 75 are located approximately two-thirds of the distance downwardly from the frame 61 to the tips of the grapple jaw members 62 and 63. In a grapple open position, for example as illustrated in FIG. 1, the chain is substantially horizontal and located parallel and adjacent to the lower edge of frame member 61 and a relatively straight leg portion of the respective jaw members 62 and 63. In a grapple closed position (see FIG. 7), the chain 70 engages the upper portion of a group of trees and retraction of the piston rod into the cylinder portion of the respective hydraulic cylinder assemblies 72 and 73 places a tensile force on the chain thereby anchoring the trees to the grapple. It is thus apparent various sized loads may be anchored to the grapple whereby the grapple may be utilized for dragging the bundled group of trees to a selected site.

The grapple jaw members 62 and 63 (see FIG. 11) may consist of a plurality of plate-like members 80, 81, 82 and 83 disposed in parallel selected spaced relationship and interconnected by a plurality of struts or posts 86. The hydraulic cylinder assemblies 66 and 67 may be readily pivotally connected to such members. There is also a modification illustrated in the grapple in FIG. 10 in that jaw members 62 and 63 are interconnected by a single hydraulic cylinder 85 which replaces the pair of hydraulic cylinders 66 and 67 illustrated in the embodiment in FIG. 7.

Figure 12:
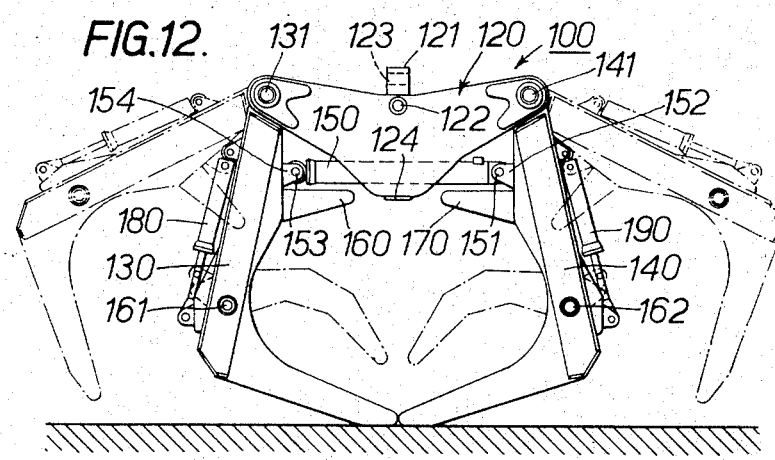
FIG. 12 is a front elevational view of a still further modified grapple in accordance with the present invention.
Figure 13:
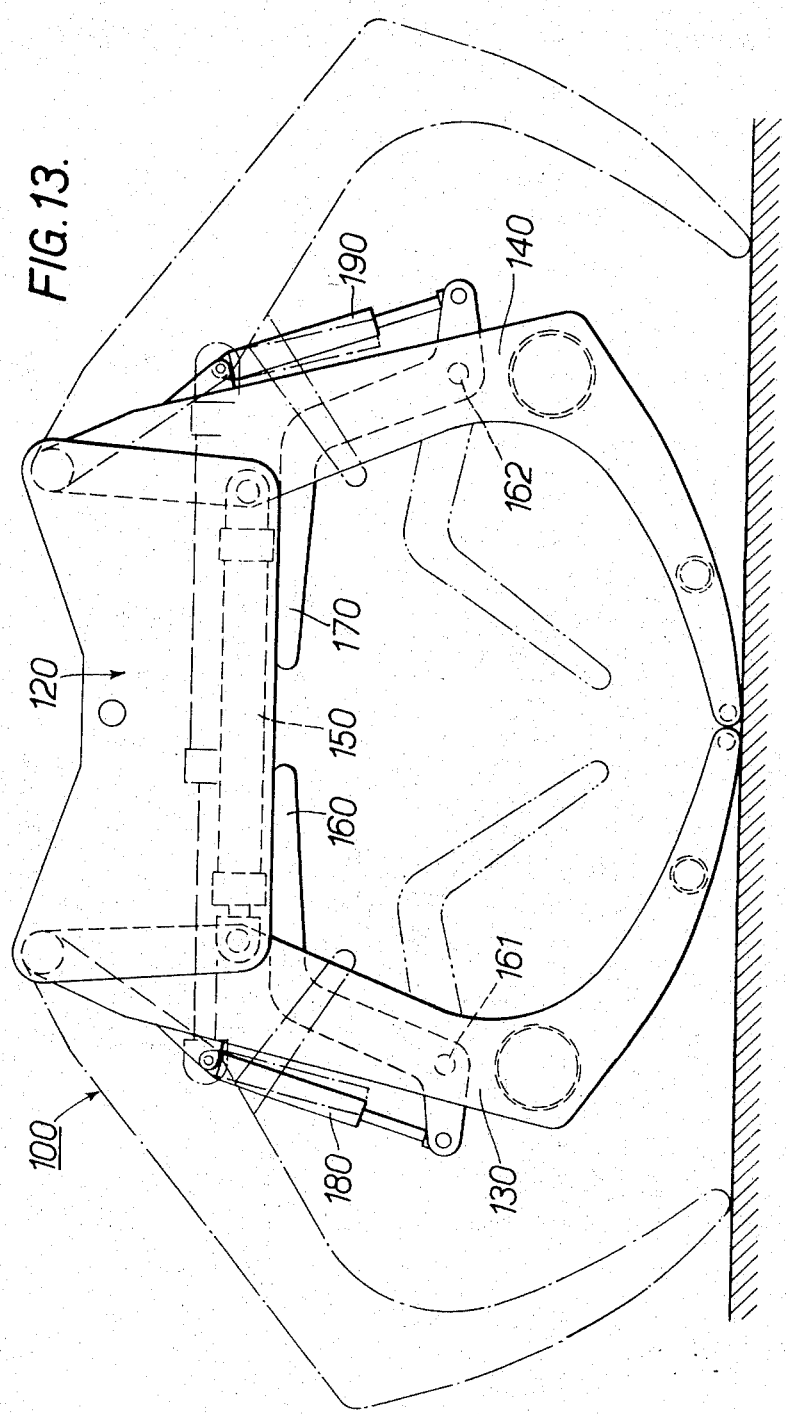
FIG. 13 is a view similar to FIG. 1 but including further modifications.

Referring now to FIGS. 12 – 16, there are illustrated various modifications to the grapple. In FIGS. 12 and 13, there is illustrated a grapple 100 consisting of a frame member 120 having a pair of arcuate lever arms 130 and 140 pivotally secured thereto to form a grapple jaw. The frame 120 may be attached to a boom member in any convenient manner, for example, by a connecting link 121 pivotally attached to the frame 120 by a pivot pin 122 and to the grapple by a pin passing through an aperture 123 having the axis thereof substantially normal or at right angles to the pivot axis of pin 122.

The lever arms 130 and 140 are pivotally secured to the frame 120 respectively by pivot pins 131 and 141 disposed in horizontal spaced relation. The arms may be pivoted about their respective axes by a hydraulic cylinder assembly 150 pivotally interconnected at opposed ends to respective arms 130 and 140. The cylinder portion, for example, is connected by pivot pin 151 to a lug 152 secured to and directed inwardly from the arm 140 toward the other arm 130. Similarly, the opposite end of the hydraulic cylinder assembly 150 has the piston rod connected by a pivot pin 153 to a lug 154 secured to the arm 130 and projecting therefrom in a direction toward the arm 140.

In the embodiment illustrated in FIG. 12, the frame 120 consists of a pair of plates disposed in spaced parallel relationship and the hydraulic cylinder, for purposes of protection, is located between a portion of such plates. The lower edge of the plates is curved downwardly and interconnected, for example, by a plate member 124. Alternatively, the lower edge of the frame 120 may be horizontal as, for example illustrated in FIG. 13. The arms 130 and 140 together with the frame 120 in a closed position, embrace a certain selected area which might be referred to as the bite area of the jaw. Such bite area may be considerably reduced after the jaw arms 130 and 140 are closed thereby adapting the grapple for grasping and embracing tightly various sizes of articles or groups of articles. In this regard, lever arms 160 and 170 are pivotally secured to respective arms 130 and 140 by respective ones of a pair of pivot pins 161 and 162. The arms 160 and 170 are arcuate in shape, having the concave side facing the respective arms 130 and 140 to which they are attached. The arms 160 and 170 terminate in a tip portion disposed, in one position adjacent the lower edge of frame 120, and are pivotally movable from such a position in a direction such that the tips approach the tip end of the respective arms 130 and 140 to which they are attached. Effectively, the arm 160 and the arm 130 form a further grapple jaw as does also the arm 170 and arm 140 to which it is attached. The arms 160 and 170 are pivoted about their respective pins by respective ones of hydraulic cylinder assemblies 180 and 190. The hydraulic cylinder assembly 180 is pivotally connected at one end to the arm 130 and at the other end to a portion of the lever 160 extending beyond the pivot pin 161. Similarly, hydraulic cylinder assembly 190 is pivotally connected at one end to the lever arm 140 and at the opposite end to a portion of lever 170 extending beyond the pin 162.

Figure 14:
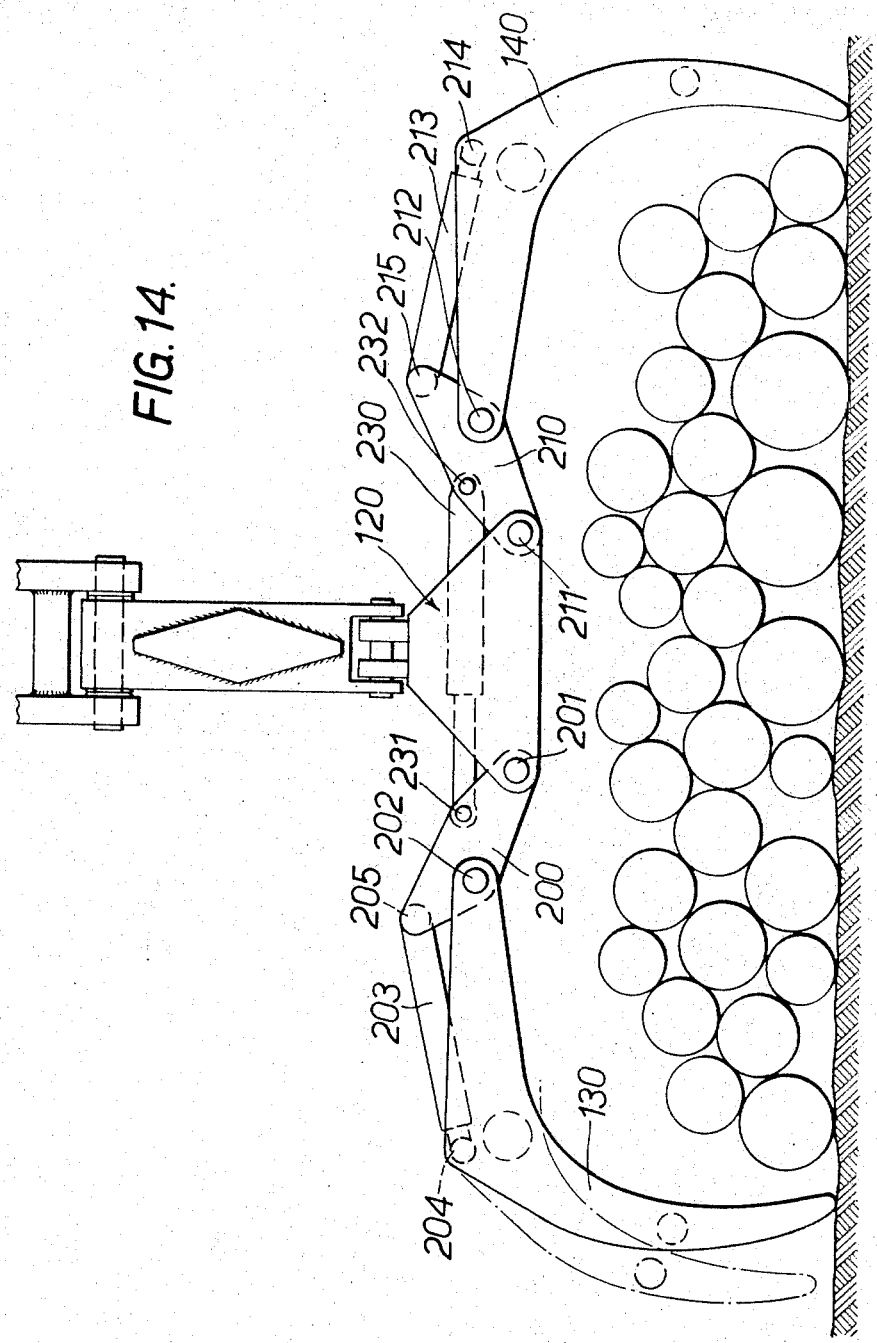
FIG. 14 is an elevational view of a still further modified grapple in an open position.
Figure 15:
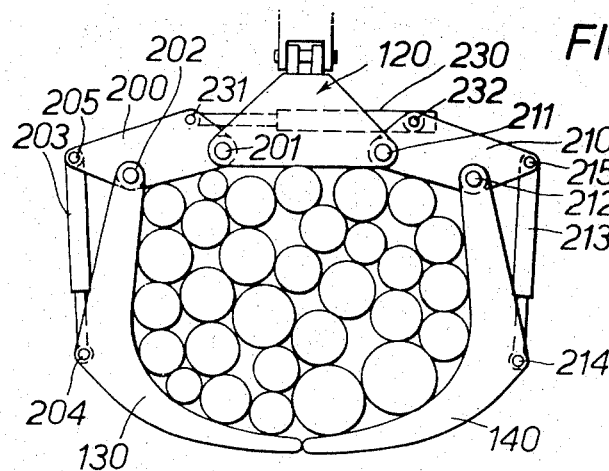
FIG. 15 is a view of a grapple similar to that illustrated in FIG. 14, but in a closed position.

From the foregoing, it is readily apparent that the hydraulic cylinder 150 may be utilized to effect opening and closing of the grapple jaw provided by arms 130 and 140. Effectively, this forms a first grapple having a relatively wide reach for collecting and grasping a plurality of articles in a manner as illustrated in FIGS. 1 and 14. With the grapple jaw in a closed position, for example, as illustrated in FIG. 15 embracing a plurality of trees, cylinder assemblies 180 and 190 may be retracted so as to pivot the respective arms 160 and 170 downwardly to engage the upper edge of the group of trees held captive by the first jaw. The members 160 and 170 accordingly apply a force on the collected articles to clampingly anchor such articles to the jaw. It is obvious that the lever arms 160 and 170 may be replaced by a single arm which extends from either one of the arms 130 and 140 toward the other member.

A further modified grapple is illustrated in FIG. 14 wherein link members 200 and 210 are located intermediate respective grapple jaw arms 130 and 140 and the frame 120. The link member 200 is pivotally connected to the frame 120 by a pivot pin 201 and to the lever arm 130 by a pivot pin 202. A hydraulic cylinder 203 is pivotally connected, respectively, at opposed ends to the arm 130 and link 200 by respective ones of pivot pins 204 and 205. Similarly, link member 210 is connected by pivot pins 211 and 212 to the frame 120 and arm 140. A hydraulic cylinder 213 is connected at opposed ends, respectively, by pins 214 and 215 to the arm 140 and link 210. A hydraulic cylinder 230 is pivotally connected at opposed ends by pins 231 and 232 respectively to link members 200 and 210.

From the foregoing, it will be readily apparent the arms 130 and 140 are movable from an open to a closed position and vice versa by appropriate actuation of hydraulic cylinders 203 and 213. The bite area of the jaw formed by members 130 and 140, when in a closed position, may be varied by extending and retracting hydraulic cylinder 230 thereby moving the links 200 and 210.

Figure 16:
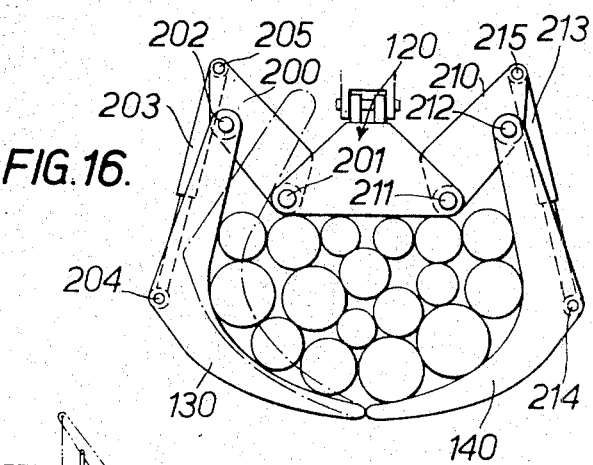
FIG. 16 is a further view of the grapple illustrated in FIGS. 14 and 15, but engaging a considerably smaller group of trees then engaged by the grapple illustrated in FIG. 15.

FIGS. 15 and 16 diagrammatically illustrate a grapple, of the type shown in FIG. 14, respectively with a relatively large group of trees clasped in the jaw and with a substantially smaller group of trees.

In the foregoing latter embodiment of the grapple, the grapple effectively consists of a first grapple jaw (members 130 and 140) having a relatively wide space between the tips when in an open position for collecting a plurality of trees or the like piled one on top of the other. With the tips of the jaws widely spread, an operator of a vehicle collecting bunched trees is able to assemble a relatively wide group of trees and thereafter pivot the jaws to a closed position embracing the entire pile. After the pile of trees has been embraced, the bite area of the jaw may be varied to appropriately apply pressure to the embraced lot of trees such that forces thereafter applied longitudinally along the trees does not remove the same endwise from the grapple. As previously mentioned, these longitudinal forces occur in skidding trees and the bunk 51 engaging the grapple, as previously described, provides a reactionary force for such longitudinal forces, i.e., forces having a horizontal component parallel to the length of the trees.

Figure 10:
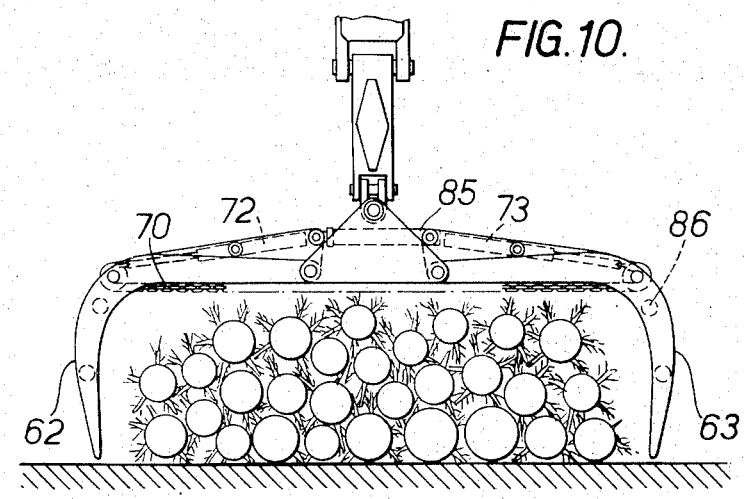
FIG. 10 is a rear elevational view of a modified grapple.
Figure 11:
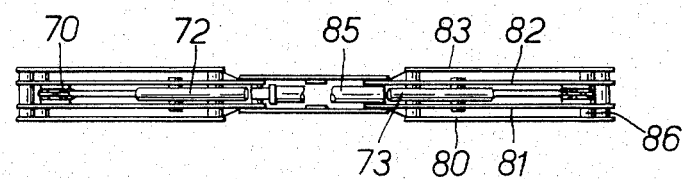
FIG. 11 is a top plan view of the grapple illustrated in FIG. 10.
Figure 17:
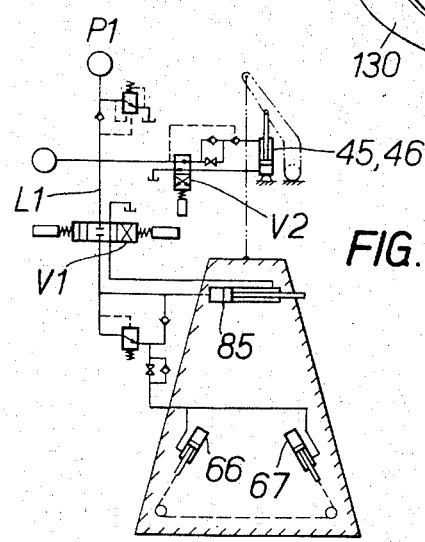
FIG. 17 is a hydraulic circuit for the bunk and grapple portion of the type of grapple illustrated in FIG. 10.

Referring to FIG. 17, there is illustrated a hydraulic schematic for a bunk grapple assembly of the type illustrated in FIG. 10. In this schematic, hydraulic cylinders 66 and 67, and grapple jaw cylinder 85 are connected to a valve V1 supplied with fluid pressure from a pump P1 through a line L1. A second valve V2 connects the line L1 to the boom tilt cylinders 45 and 46.

Figure 18:
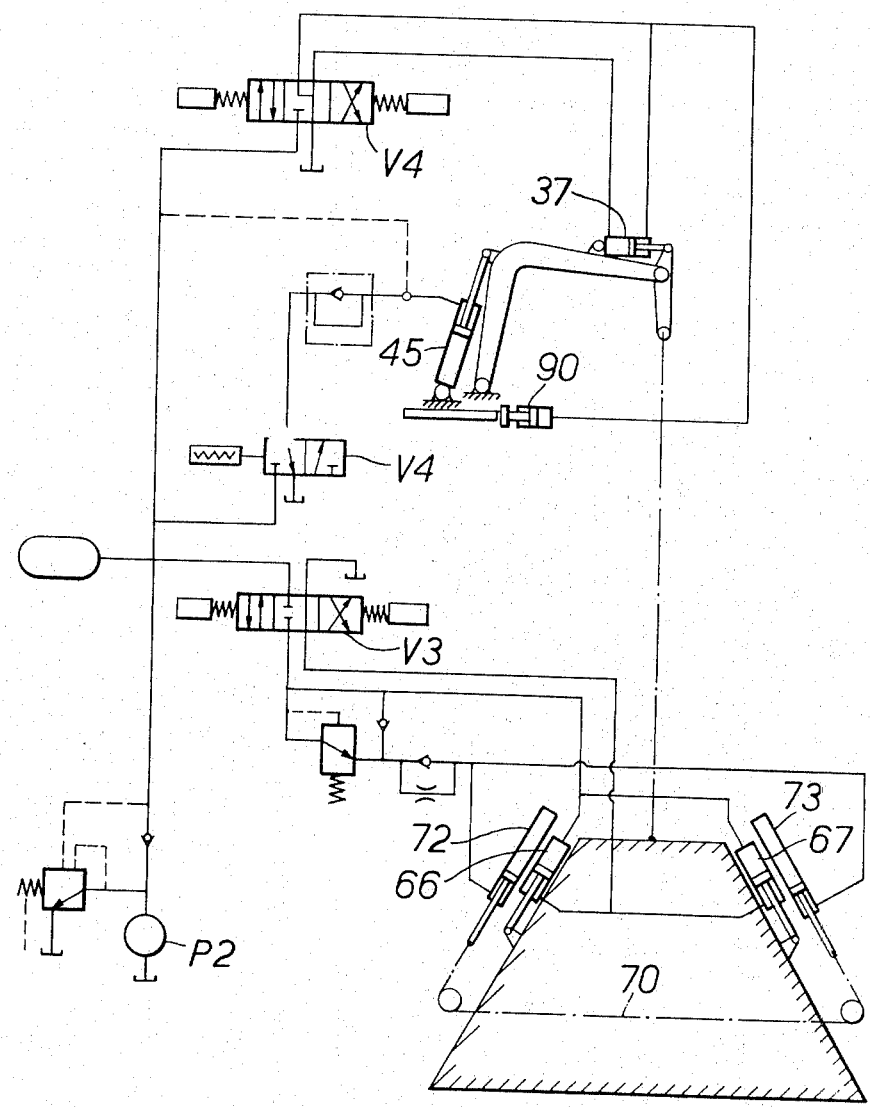
FIG. 18 is a hydraulic circuit diagram for the bunk portion of a combined boom, grapple and bunk assembly of the type illustrated in FIGS. 1 to 9 inclusive.

FIG. 18 is a schematic of the hydraulic system for the assembly illustrated in FIGS. 1 to 9 inclusive. Referring to FIG. 18, fluid from a pressure pump P2 to the grapple cylinders 66 and 67 and the chain cylinders 72 and 73 are controlled by a manually operated valve V3. Fluid from the pump P2 to the boom tilt cylinders 45 and 46 (only one shown) is controlled by a valve V4 independent of the operation of valve V3. Fluid from pump P2 to the secondary boom cylinder 37 is controlled by a valve V4. As previously mentioned, the combined boom and grapple and bunk assembly is pivotable about a vertical axis and, as illustrated in FIG. 18, a brake assembly 90 may be provided to prevent pivotal movement of the boom, grapple and bunk assembly during loading trees onto the vehicle. The brake 90 is hydraulically controlled and actuated by fluid pressure in the cylinder 37 thereby interrelating actuation of the brake and lifting forces on the secondary boom member 35.

In operation, the vehicle is backed up to a bunch of trees and, in the event the butt ends of the same are out of alignment, bumper member 28 may be driven against the trees to bring the latter into alignment. The operator then, through control of valve V4, pivots the boom clockwise such that the portion 34a is substantially vertical and the boom portion 34b is generally horizontal extending in a direction rearwardly from the vehicle. The grapple, accordingly, is located over the group of trees to be picked up and further pivoting lowers the grapple (jaw being open) to receive the group of trees. The grapple jaw is then closed to collect and embrace the group of trees whereafter hydraulic cylinder assembly 45 may be retracted in length to pivot the boom about pivot pin 40. Control of the valve V4 effects pivoting of the boom member 35 about pivot pin 36 and when the boom assembly 34 is being brought into a position approaching that illustrated in FIG. 5, boom member 35 may be pivoted to a raised position, if necessary, raising the grapple over bunk 51. After passing over the bunk 51, it may then be lowered bringing the bottom portion of the trees into engagement with the bunks 50 and/or 51. The bunk 51 not only provides a support for the load of trees but also, and of primary importance, has a bearing face adjacent and engageable with an oppositely disposed bearing face on the grapple arms 62 and 63. Abutment of such faces is caused by attempting to drag the trees and it will thus be readily apparent the bunk 51 provides reactionary forces on the grapple 32 for forces acting on trees which forces have a component parallel to the length of the trees. During skidding trees embraced by the grapple, the grapple engages, at the bottom or adjacent the tips of the jaw members, the bunk 51. The opposite side of the grapple is anchored to the boom member 35 and the horizontal components act in spaced relation with respect to the boom pivot pin 40 mounting and accordingly have a tendency, during skidding, to pivot the entire grapple and boom assembly about the pivot pin 40. The bunk member 50, engageable with the trees, provides a couple about the pin 40 in an opposite direction tending to prevent such tilting. Accordingly, in the arrangement illustrated, hydraulic cylinders 45 and 46 may remain free floating during skidding, the bunk 50 being located sufficiently forward of the pin 40 to more than counteract force couples provided in the opposite direction about the pivot pin 40 by horizontal forces acting on the bunk 51 and on the member 35.

In the foregoing description of the operation of the vehicle, it has been indicated the hydraulic cylinders 45 and 46 may be utilized to pivot the boom from the position, for example, illustrated in FIG. 1 to the position illustrated in FIG. 3. Loading also may be facilitated by the operator moving the vehicle during the loading operation and thus reducing the power requirement of the hydraulic cylinder assemblies 45 and 46. It will be readily apparent that should the operator attempt to drive the vehicle rearwardly with the boom in the position illustrated in FIG. 2, forces applied by the tree with tend to pivot the boom to the position illustrated in FIG. 3 providing, of course, the load of trees is lifted to a position where the forces applied by backing act on the bunk assembly above the pivotal connection of the boom element 34 to the mounting assembly 33, i.e., pin 40. It has been found in practice, pivoting of the boom to load the trees onto the bunk causes the vehicle to move rearwardly.

It is apparent from the foregoing the grapple is located at a position between the bunk members 50 and 51. The bunk 50 is so disposed as to engage the grapple on the side opposite to that of the bunk member 51, thus permitting a loaded vehicle to back up a certain extent.

In the foregoing description and in the claims attached hereto, the term "horizontal forces" has been utilized with reference to forces acting on the grapple and reactionary forces are provided by bunk 51 counteracting these horizontal forces. The horizontal forces referred to are those which act on the grapple in a direction angularly disposed with respect to the plane in which the grapple members move during opening and closing of the grapple jaw. It is these horizontal forces which tend to pull the trees endwise out of the grapple during skidding. For clarity and conciseness of description, it may be said the horizontal forces, of concern, are those acting generally parallel to the length of the tree during skidding of the same.

From the foregoing, it is seen there is provided a self-propelled mobile tree-handling vehicle which is adapted to align a plurality of trees disposed on the ground, assemble those trees and pick up the assembled trees to position the same on the vehicle and anchor the same to the vehicle for skidding. The size of loads which may be assembled and dragged are dependent upon the size of vehicle and capabilities of the grapple. With the type of grapple illustrated in the drawings, loads ranging in size of from one-half to one and a half cunits may be readily handled.

We claim:

1. A tree-handling vehicle comprising, in combination:
   a. a self-propelled mobile vehicle;
   b. a bumper comprising a vertically disposed rigid blade member secured to the vehicle, and located at the trailing end thereof, for engaging and abutting against the butt end of a plurality of trees lying in stacked relation on the ground;
   c. a combined boom and grapple assembly secured to said vehicle adjacent said trailing end, and including a boom assembly pivotally mounted for movement about a horizontal axis, a grapple assembly pivotally connected to and suspended from said boom, said boom being movable to a first position to locate the grapple beyond the vehicle for embracing said stacked plurality of trees adjacent the butt end thereof and to a second position raising said grasped butt ends off the ground and means for pivoting said boom; and
   d. abutment means, on said vehicle, engaging said grapple at a position spaced from the pivotal connection thereof to the boom at least during the skidding of trees grasped by said grapple.

2. A tree-handling vehicle as defined in claim 1 including a load-engaging abutment secured to said boom and disposed at a position forwardly, with reference to direction of travel of the vehicle during skidding of one or more trees grasped by the grapple, of the pivotal connection of the boom to said vehicle permitting movement about said horizontal axis.

3. A tree-handling vehicle as defined in claim 1 wherein said abutment means has an upper surface, engageable with the load, extending in a direction generally parallel to the said horizontal pivot axis.

4. A tree-handling vehicle as defined in claim 3 wherein said surface is concave providing a cradle for said load.

5. A tree-handling vehicle as defined in claim 1 wherein said blade member is pivotally mounted on said vehicle for movement about an axis extending transverse of the vehicle.

6. A tree-handling vehicle as defined in claim 5, including a resilient stop limiting the lowermost position of said blade member.

7. A tree-handling vehicle as defined in claim 1, including means pivotally mounting said boom and grapple assembly on the vehicle for movement about a substantially vertical axis.

8. A tree-handling vehicle as defined in claim 7, including means selectively restraining pivotal movement of said boom and grapple about said vertical axis.

9. A tree-handling vehicle as defined in claim 1 wherein said boom member is arcuate having one portion pivotally connected to a base for movement about a horizontal axis and a further portion contiguous with the first portion and movable, by pivoting said boom, to each of a vertical position and a horizontal position.

10. A tree-handling vehicle as defined in claim 1 wherein said grapple comprises a frame, a first rigid jaw member and a second rigid jaw member each secured to said frame with the connections of said members to said frame being disposed in selected spaced relation, at least one of said jaw members being arcuate and concave in a direction facing the other jaw member, and at least one of which is movable toward and away from the other to form a jaw respectively which is closed and opened by such movement, and in a closed position, has a selected bite area and a further pair of rigid jaw members pivotally secured to respective ones of said first and second members and means to move said further pair of jaw members selectively to vary said bite area when said jaw is closed.

11. A tree-handling vehicle as defined in claim 1 wherein said grapple comprises a frame, a pair of arms each pivotally secured to said frame to form a grapple having a jaw, means for moving said pair of arms relative to one another selectively to open and close said grapple jaw, and a flexible member anchored at opposed ends to said frame and arm assembly, at least one of said opposed ends being connected to an extendible and retractable assembly, said flexible member being slidably engageable intermediate the ends thereof with each of said arms and engaging respective ones of the arms at a selected position located between the free end of such arm and the connection thereof to the frame.

12. A tree-handling vehicle as defined in claim 1, including means pivotally mounting the boom and grapple assembly for movement about a vertical axis comprising a pair of plates in face-to-face relation and adapted to be secured respectively to the vehicle and boom base and pin means pivotally interconnecting the same.

13. A tree-handling vehicle as defined in claim 9, including a secondary boom member pivotally connected to the arcuate boom member adjacent the free end of the latter and power means for pivoting said secondary boom member relative to the arcuate boom member.

14. A tree-handling vehicle as defined in claim 13 wherein said arcuate boom member and secondary boom member are together C-shaped in side elevational view.

15. A vehicle for handling trees or the like comprising, in combination:
   a. a self-propelled mobile vehicle;
   b. an operator's station on said vehicle;
   c. a boom pivotally mounted on said vehicle for pivotal movement about a horizontal axis;

d. grapple means pivotally attached to said boom in spaced relation with respect to the pivotal connection of the boom to the vehicle;

e. means pivoting said boom to a first position locating the grapple suspended therefrom beyond the vehicle to grasp a load, adjacent one end thereof, supported on a surface and to a second position raising said one end of the load off said supporting surface;

f. a first load abutment means secured to said boom and located in spaced relation with respect to the pivotal connection of the boom to the vehicle at a position engaging said load forwardly, with reference to the direction of travel of said vehicle during skidding of said load, of the pivotal connection of said boom to the vehicle; and g. a second abutment means on said vehicle located rearwardly of and vertically above the lowermost free terminal end of the grapple in the boom second position, and having a forwardly facing surface engageable with said grapple adjacent the free terminal end thereof during skidding of a load, said surface providing a reaction for forces acting on the grapple which tend to remove the trees from the grapple during skidding by forward movement of the vehicle, each of said first and second abutments having an upper surface engageable with said load providing a bunk for supporting said load.

16. A tree-handling vehicle as defined in claim 15 wherein the first and second abutments are spaced apart from one another at a distance slightly greater than the thickness of the grapple adjacent the lowermost terminal end thereof, taken in a direction perpendicular to a plane in which the grapple jaws are movable whereby the first and second abutments engage the grapple respectively on rearward and forward movement of the vehicle.

17. A tree-handling vehicle as defined in claim 16 wherein each said abutment means comprises a member having a concave upper surface extending in a direction generally parallel to said horizontal axis.

18. A tree-handling vehicle as defined in claim 17 wherein said grapple includes means selectively varying the bite size when the grapple is in a jaw-closed position.

19. A tree-handling vehicle as defined in claim 17 wherein said first and second abutments and said boom and grapple comprise a boom, grapple and bunk assembly and means mounting such assembly on said vehicle for movement about a substantially vertical axis.

20. A self-loading, self-unloading tree skidder comprising:

a. a mobile self-propelled vehicle; and b. a combined boom, grapple and bunk assembly pivotally mounted on said vehicle for movement about a substantially vertical axis, said boom, grapple and bunk assembly comprising:

i. a base member pivotally mounted on said vehicle for movement about said vertical axis;

ii. an articulated boom pivotally mounted on said base member for movement about a substantially horizontal axis;

iii. a grapple pivotally suspended from said boom adjacent the free end thereof and freely movable to remain in substantially a vertical plane during movement of said boom about its pivotal connection to said base member;

iv. a laterally extending bunk on said boom adjacent the pivotal connection thereof to said base member and having an upper surface for supporting one end of a load of trees grasped by said grapple; and v. means for pivotally moving said boom from one position to another wherein, in one position, the grapple is located rearwardly beyond the vehicle for picking up a load of trees lying on the ground and, in another position wherein said grapple is located between the ends of the vehicle at which position the load of trees grasped by the grapple is supported on said bunk and at least during skidding of the load by forward movement of the vehicle, the grapple is in engagement with a forward face of the bunk.

21. A tree skidder as defined in claim 20, including means selectively restraining pivotal movement of said boom, grapple and bunk assembly about said vertical axis.

22. A tree skidder as defined in claim 20, including a further laterally extending bunk member secured to said boom at a position forwardly of the pivotal connection of the boom to base member in a vehicle-loaded state.

23. A tree skidder as defined in claim 22 wherein said pair of laterally extending bunks on said boom are spaced apart relative to one another a distance slightly greater than the thickness of the grapple taken in a direction transverse to the direction of movement of the grapple jaw members during opening and closing of the grapple jaw.

24. A tree skidder as defined in claim 23 wherein the most rearwardly one of said bunks is located adjacent the pivotal connection of the boom to said base member.

25. A self-loading, self-unloading tree skidder comprising a vehicle adapted to be propelled along the ground, an articulated boom pivotally mounted on said vehicle near one end thereof for movement about each of a vertical and horizontal axis, power means connected between said vehicle and said boom selectively to effect movement of said boom wherein, in a first position, the free end of said boom is located between the ends of said vehicle, and in a second position wherein the free end of said boom is located beyond said one end of said vehicle, a log grapple suspended from said boom adjacent the free end thereof and freely pivoted to remain in a substantially vertical plane during movement of the boom from its one said first and said second positions to the other, and a laterally extending bunk on said boom adjacent the pivotal connection thereof to said vehicle for supporting a load grasped by said grapple and engaging said grapple in the first position of said boom.

26. A method of loading a log skidder for skidding the load comprising:

a. grasping a group of trees adjacent the butt end thereof with a grapple;

b. pivoting a boom having said grapple suspended from the free end thereof to raise the grasped butt end of the trees vertically off the ground and simultaneously therewith moving said vehicle, relative thereto, rearwardly to place a bunk on said vehicle under the butt ends of the trees at a position rearwardly of the lower end of the grapple;

c. lowering the load to place the same on the bunk with the tip end of the grapple adjacent such bunk and forwardly thereof and
d. maintaining a grip on the load with said grapple while moving the vehicle in a forward direction to skid the load of trees, the lower end of said grapple abutting the bunk during skidding of the trees, transmitting forces imposed on said grapple during skidding into the bunk structure.

* * * * *